United States Patent [19]
Sarti et al.

[11] 4,108,273
[45] Aug. 22, 1978

[54] POWER ASSISTED STEERING

[75] Inventors: Vincenzo Sarti, Turin; Antonino Bertone, Sant'Antonino (Vercelli); Enrico Rivetti, Turin, all of Italy

[73] Assignee: Fiat Societa per Azioni, Turin, Italy

[21] Appl. No.: 795,849

[22] Filed: May 11, 1977

[30] Foreign Application Priority Data

Nov. 25, 1976 [IT] Italy ................................ 69812 A/76

[51] Int. Cl.² .............................................. B62D 5/08
[52] U.S. Cl. ..................................... 180/148; 91/422; 91/431
[58] Field of Search ................... 180/148; 91/357, 422, 91/431, 463

[56] References Cited

U.S. PATENT DOCUMENTS 3,465,645  9/1969  Mala ................................. 91/431 X
3,611,877  10/1971 Baxter ................................. 91/431

Primary Examiner—John A. Pekar
Attorney, Agent, or Firm—Sughrue, Rothwell, Mion, Zinn and Macpeak

[57] ABSTRACT

A power assisted hydraulic steering device in which the hydraulic actuators and the control valves are all contained in a common cylindrical housing surrounding a control shaft connectable to the steerable wheels of the vehicle, the actuator comprises an annular piston formed on the control shaft and housed in a cylinder defined between the control shaft and the sleeve. A control rod linked to the steering column is housed within the control shaft, which is hollow, and carries a valve element which cooperates with interior parts of the hollow control shaft to control fluid pressure applied to one side of the annular piston to cause displacement in one direction, or both sides of the annular piston, which has different areas on opposite sides, to cause displacement in the opposite direction.

6 Claims, 3 Drawing Figures

POWER ASSISTED STEERING

The present invention relates to a simple hydraulic power-assisted steering device, in which the hydraulic components and the mechanical components are all contained in a common housing.

In prior art power assisted hydraulic steering devices the majority of the control components of the hydraulic system are separate from the mechanical parts of the steering. This obviously presents space problems not only for the lay-out of the valves of the hydraulic system, but also for the positioning of the pipework and the actuators. One example of a known power assisted steering device is described in German Patent Application No. 2,114,314 by the Firm of Laugen & Co., of Dusseldorf, which was published in 1972.

The technical problems which the present invention seeks to solve, is to provide a power assisted steering device which has a mechanical linkage to ensure control of the vehicle in the event of failure of the hydraulic system, and which is small in size and of reasonable cost.

According to the present invention a hydraulic power assisted steering device, comprises a support sleeve within which is mounted an axially slidable hollow shaft, the two ends of which project from the support sleeve and are connectable to the steerable wheels of the vehicle, a control rod axially slidable within the hollow shaft and carrying a valve head which cooperates with a radially inwardly directed projection of an intermediate section of the hollow shaft which also has a radially outwardly projecting part having two opposite radial faces which form end walls in respective chambers defined between the hollow shaft and the sleeve, the radial face of the said intermediate section of the hollow control shaft exposed in one of the said two chambers being smaller than the radial face of the said intermediate section of the hollow shaft exposed in the other of the said two chambers, which latter are connected in series by passages in the walls of the hollow shaft and in the intermediate section thereof, the valve head being so shaped that in use of the device, with hydraulic fluid being circulated around the hydraulic circuit, displacement of the control rod axially in one direction with respect to the hollow shaft causes a restriction in the said passages such as to create an increase in pressure in the said one of the two chambers resulting in displacement of the hollow shaft in a first direction, and axial displacement of the control rod in the other direction with respect to the hollow shaft causes a restriction in the passages such as to create an increase in pressure in both of the said two chambers resulting in displacement of the hollow control shaft in the opposite direction due to the difference in areas of the radial faces of the intermediate section thereof exposed in the two chambers.

One embodiment of the invention will now be more particularly described, by way of example, with reference to the accompanying drawings, in which.

Figure 1:
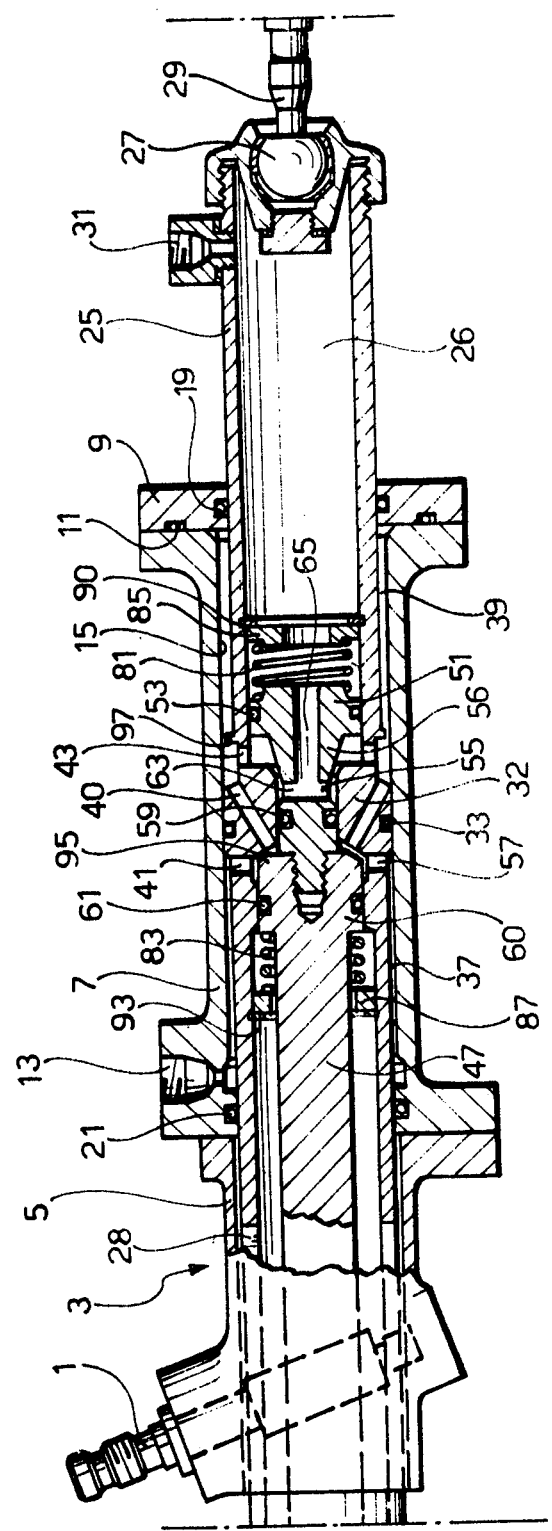
FIG. 1 is an axial sectional view of the embodiment.

Referring now to the drawings, there is shown the lower end of a steering column 1 of a vehicle which is connected into a sleeve 3 having first and second coaxial parts 5 and 7 joined end to end.

The second part 7 of the sleeve has an inlet port 13 for hydraulic fluid fed by a pump (not shown in the drawings) driven, for example, by the engine of the vehicle. The inner bore 15 of the said portion 7 of the sleeve 3 has a diameter slightly greater than the diameter of the inner bore of the first part 5 of the sleeve 3, except at the end where it contacts the said first part 5 where it is substantially equal.

Slidably mounted within the sleeve 3 is a hollow shaft 25 which is of slightly smaller diameter than the inner bore of the second part 7 of the sleeve 3. Part way along its length the hollow shaft 25 has a short intermediate section 32 projecting radially inwardly and radially outwardly with respect to the remainder of the hollow shaft 25. The intermediate section 32 is a sliding fit within the second part 7 of the sleeve 3 and carries a sealing ring 33. To the left of the section 32 (with reference to the orientation shown in FIG. 1) the shaft 25 defines, with the inner bore of the second part 7 of the sleeve 3 a first cylindrical chamber 37 which communicates with the inlet port 13, and to the right of the section 32 the shaft 25 defines with the second part 7 of the sleeve 3 a second cylindrical chamber 39. The first cylindrical chamber 37 is sealed by a sealing ring 21 in the end of the second part of the sleeve 3 and the second cylindrical chamber 39 is sealed by a sealing ring 19 in an annular end cap 9 which closes the right hand end of the second part 7 of the sleeve 3. The annular end cap 9 also has a second sealing ring 11 which seals the end face of the second part 7 of the sleeve 3. The outer diameter of the hollow shaft 25 to the left of the intermediate section 32 is substantially the same as the inner diameter of the first part 5 of the sleeve 3 such that the shaft 25 is a sliding fit therein, and the outer diameter of the hollow shaft 25 to the right of the intermediate section 32 is somewhat smaller than this so that the second cylindrical chamber 39 is larger than the first cylindrical chamber 37. The two ends of the hollow shaft 25 project on either side of the sleeve 3 and are connected by means of ball joints 27 and tie rods 29, to the vehicle steering wheels (not shown in figures).

The second cylindrical chamber 39 is in fact, of twice the volume of the first cylindrical chamber 37, and the two chambers 37 and 39 communicate with one another through a series of passages in the wall of the hollow shaft 25 in the vicinity of the intermediate section 32. These communication passages comprise a series of radial holes 41 situated immediately to the left of the intermediate section 32 connecting the first cylindrical chamber 37 with the inner cavity 26 of the hollow shaft 25, a series of radial holes 43 situated immediately to the right of the intermediate section 32 connecting the second cylindrical chamber 39 with the inner cavity 26 of the hollow shaft 25 and a series of passages 40 traversing the intermediate section 32, the passages 40 being inclined with respect to the axis of the hollow shaft 25.

Within the hollow shaft 25 there is located a solid shaft 47. One end of the solid shaft 47 is connected by means of a rack and pinion system (shown in broken outline in FIG. 1) with the steering column 1, which latter passes through a slot 28 in the wall of the hollow shaft 25 which slot permits the steering column 1 to project into the interior cavity 26 of the hollow shaft 25 and at the same time permits axial movement of the hollow shaft 25 to take place.

The other end of the solid shaft 47 is fitted with a valve head which projects through the intermediate section 32 of the hollow shaft 25. The valve head comprises a first portion 51 on the right of the intermediate section 32, of diameter substantially equal to the diameter of the interior cavity 26 of the hollow shaft 25. The first portion 51 of the valve head has a sealing ring 53 which seals against the inner wall of the interior cavity 26 of the hollow shaft 25. The first portion 51 is joined to a second portion 55, of diameter less than the inner diameter of the intermediate section 32 of the hollow shaft 25, by a conical portion 56. The second portion 55 of the valve head is located within the bore in the intermediate section of the hollow shaft 25 and is traversed by a transverse passage 63 which communicates with an axial passage 65 passing through the first portion of the valve head and opening into the interior cavity 26 of the hollow shaft 25. Connected to the second portion 55 of the valve head is a third portion 57 having a diameter substantially equal to the bore in the intermediate section 32 of the hollow shaft 25 so as to be a sliding fit therein, and fitted with a sealing ring 59.

The third portion 57 of the valve head is screwed into an end part 60 of the solid rod 47 which is of larger diameter than the remainder of the solid rod 47, is a sliding fit in the hollow shaft 25 and fitted with a sealing ring 61.

The edges of the intermediate section 32 of the hollow shaft 25 are bevelled and the end of the solid rod 47 is also formed with a bevel 95 at the same angle. The valve head is held in a predetermined position, with the bevel on the end of the solid rod 47 spaced from the bevel on the adjacent edge of the intermediate section 32 of the hollow shaft 25 and the conical portion 56 of the valve head spaced from the adjacent bevelled edge of the intermediate section 32 of the hollow shaft 25 by two opposed springs 81 and 83 which engage at one end against respective seatings on the first portion 51 of the valve head and the end part 60 of the solid rod 47, and at the other end against respective annular abutments 85, 87 held in position by respective circlips 90 and 93 located in grooves in the inner wall of the hollow shaft 25.

Figure 2:
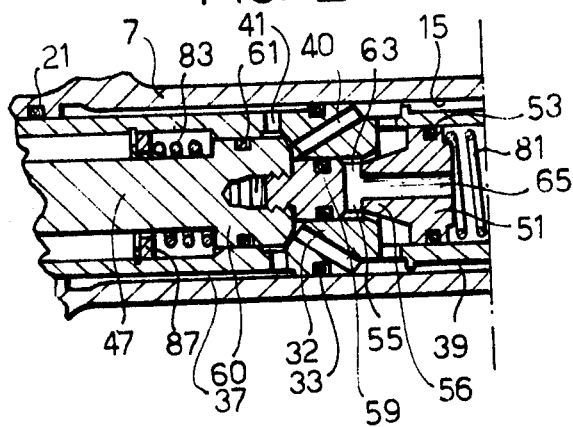
FIG. 2 is an axial sectional view of a part of the embodiment of FIG. 1 in one operational position.

The bevelled end 95 of the solid rod 47 forms, with the adjacent bevelled edge of the intermediate section 32 of the hollow shaft 25 a first restrictor throttle to the flow of fluid which, in use of the device, enters through the inlet port 13, flows along the first cylindrical chamber 37 through the radial holes 41, past the throttle formed by the bevelled end 95 and the adjacent bevelled edge of the intermediate section 32 of the hollow shaft 25, through the inclined passages 40 in the intermediate section 32 into the second cylindrical chamber 39. From the second cylindrical chamber 39 fluid flows through the radial holes 43, into the transverse passage 63 in the second portion of the valve head, and from therethrough the axial passage 65 into the interior cavity 26 of the hollow shaft 25, which has an outlet port 31 through which the fluid can flow to a reservoir (not shown). The cylindrical chambers 37 and 39 are thus connected in series in the hydraulic circuit and in the equilibrium position illustrated in FIG. 1 no forces are exerted between the sleeve 3, which would be fixed to the fixed frame or body of the vehicle, and the hollow shaft 25 which is attached to the control linkage of the steerable wheels of the vehicle. If the steering wheel of the vehicle is turned to cause, via the rack and pinion linkage, displacement to the right of FIG. 1 of the solid rod 47, the device will adopt the position illustrated in FIG. 2 in which the bevelled end 95 of the solid rod 47 closely approaches the adjacent bevelled edge of the intermediate section 32 of the hollow shaft 25. This causes a restriction to the flow of fluid creating an increase of pressure in the first cylindrical chamber 37 and a decrease of pressure in the second cylindrical chamber 39. This increase in pressure acting upon the annular wall of the intermediate section 32 of the hollow shaft 25, exerts a force on the hollow shaft 25 urging this to the right of FIG. 1. The force applied by the fluid circuit reinforces the force exerted on the hollow shaft 25 by compression of the spring 81 upon displacement of the rod 47 and displacement of the hollow shaft 25, via the ball joints 27 and the link rods 29 causes the steerable wheels of the vehicle to turn.

Figure 3:
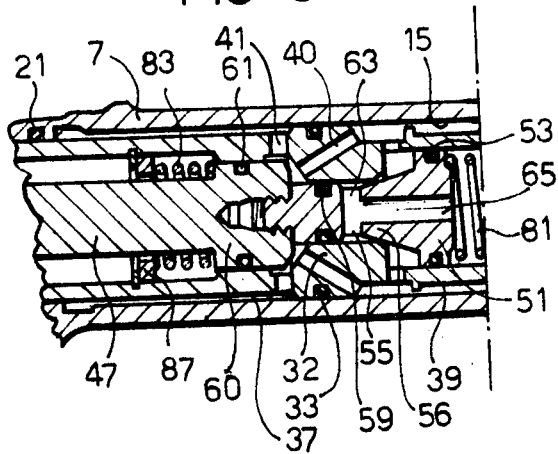
FIG. 3 is an axial sectional view of a part of the embodiment of FIG. 1 in a second operational position.

By turning the steering wheel in the opposite direction the solid rod 47 is caused to move to the left bringing the conical surface 97 close to the adjacent bevelled edge of the intermediate section 32 of the hollow shaft 25 as shown in FIG. 3. This again causes a restriction in the fluid circuit, but this time the pressure is increased in both the first cylindrical chamber 37 and in the second cylindrical chamber 39. This causes the opposed forces to be exerted on the opposite faces of the intermediate section 32 of the hollow shaft 25, but since the area of the radial wall of the intermediate section 32 exposed to the second chamber 39 is twice the size of that exposed to the first chamber 37 the resultant force applied to the hollow shaft 25 causes displacement thereof towards the left of FIG. 1 thereby causing the steerable wheels to be turned in the opposite direction via the ball joints 27 and link rods 29.

It will be apparent that even if the pressure generator should fail, the steering would nevertheless operate mechanically either in one direction or the other since one or other of the abutment surfaces 95 or 97 depending on the direction in which the steering wheel is turned would abut against the intermediate section 32 so that the hollow shaft 25 would be displaced either to the right or to the left by the force exerted mechanically thereon.

It will also be noted that the flow of hydraulic fluid through the servo control device is always in the same direction regardless of the direction in which the steering wheel is turned.

What is claimed is:

1. A hydraulic power assisted steering device comprising:
   a support sleeve,
   a hollow shaft axially slidable within said support sleeve, the two ends of said hollow shaft projecting from the support sleeve and carrying means for connection to the steerable wheels of the vehicle,
   an intermediate section of said hollow shaft, said intermediate section having a radially inwardly directed projecting part, and a radially outwardly directed projecting part having two opposed radial faces,
   a control rod axially slidable within said hollow shaft on one side of said intermediate section,
   a valve head carried on said control rod and located on the opposite side of said intermediate section,
   a portion of said valve head being slidably disposed within said radially inwardly directed projecting part of said intermediate section of said hollow shaft in sealed relation thereto, said two opposed radial faces of said radially outwardly projecting part forming end walls of first and second chambers defined between said hollow shaft and said support sleeve, the face of said intermediate section of said hollow shaft exposed in said first of said two chambers being smaller than the radial face of said intermediate section of said hollow shaft exposed in said second of said two chambers, means defining a plurality of passages in the walls of said hollow shaft, in said intermediate portion thereof, in said valve head, between said intermediate portion of said hollow shaft and said valve head and between said intermediate portion of said hollow shaft and said control rod, means for connecting said device into a hydraulic circuit comprising inlet means in communication with the first of said two chambers and outlet means in communication with the portion of said hollow shaft on said opposite side of said intermediate section; said plurality of passages interconnecting said inlet and outlet means in series so that upon displacement of said control rod axially in one direction toward said intermediate section of said hollow shaft the passage therebetween will be restricted to create an increase in pressure in said first of said two chambers resulting in displacement of said hollow shaft in a first direction and upon axially displacement of said control rod in the other direction with respect to said intermediate portion of said hollow shaft the passage between said intermediate section of said hollow shaft and said valve head will be restricted such as to create an increase in pressure in both of said two chambers resulting in displacement of said hollow shaft in the opposite direction due to the difference in areas of said radially faces of said intermediate section of said hollow shaft exposed in said first and second chambers.

2. A hydraulic power assisted steering device as in claim 1, wherein said first and second chambers are substantially cylindrical and said first chamber has a cross-sectional area which is half that of said second chamber.

3. A hydraulic power assisted steering device as in claim 1, wherein said radially inwardly projecting part of said intermediate section of said hollow shaft has bevelled edges with which parts of said control rod and said valve head cooperate in forming restriction throttles for restricting the flow of hydraulic fluid upon axial displacement in one direction or the other of said control rod with respect to said hollow shaft.

4. A hydraulic power assisted steering device as in claim 1, wherein said control rod is formed with a rack for forming part of a rack and pinion coupling with a cooperating pinion on the steering column of a vehicle to which the device is fitted.

5. A hydraulic power assisted steering device as in claim 1, wherein said valve head has a first part of substantially the same diameter as the interior bore of said hollow shaft, said first part being slidably sealed in said bore of said hollow shaft on the opposite side of said intermediate section of said hollow shaft from said control rod, a second part connected to said first part by a conical part, a third part connected to said second part and attached to said control rod, said projecting part of said intermediate section of said hollow shaft in sealed relation thereto.

6. A hydraulic power assisted steering device as in claim 5, wherein said second part of said valve head is of smaller diameter than said third part.

* * * * *